(12) United States Patent
Eymann et al.

(10) Patent No.: US 10,124,683 B2
(45) Date of Patent: Nov. 13, 2018

(54) ENERGY TRANSMISSION DEVICE AND ENERGY TRANSMISSION SYSTEM

(71) Applicant: Robert Bosch GmbH, Stuttgart (DE)

(72) Inventors: Thomas Eymann, Burgdorf (DE); Peter Schubert, Leingarten (DE)

(73) Assignee: Robert Bosch GmbH, Stuttgart (DE)

( * ) Notice: Subject to any disclaimer, the term of this patent is extended or adjusted under 35 U.S.C. 154(b) by 254 days.

(21) Appl. No.: 14/441,779

(22) PCT Filed: Sep. 17, 2013

(86) PCT No.: PCT/EP2013/069216
§ 371 (c)(1),
(2) Date: May 8, 2015

(87) PCT Pub. No.: WO2014/075835
PCT Pub. Date: May 22, 2014

(65) Prior Publication Data
US 2015/0283910 A1    Oct. 8, 2015

(30) Foreign Application Priority Data
Nov. 15, 2012  (DE) .................. 10 2012 220 913

(51) Int. Cl.
*H02J 5/00*      (2016.01)
*H02J 50/10*    (2016.01)
(Continued)

(52) U.S. Cl.
CPC ............ *B60L 11/182* (2013.01); *H01F 38/14* (2013.01); *H02J 5/005* (2013.01); *H02J 7/025* (2013.01);
(Continued)

(58) Field of Classification Search
CPC ................ B60L 11/182; B60L 11/1822; B60L 11/1824; B60L 11/1825; B60L 11/1827;
(Continued)

(56) References Cited

U.S. PATENT DOCUMENTS

| | | | |
|---|---|---|---|
| 8,035,255 B2 * | 10/2011 | Kurs ..................... | B60L 11/007 307/104 |
| 2011/0074346 A1 | 3/2011 | Hall et al. | |
| 2011/0285349 A1 | 11/2011 | Widmer et al. | |

FOREIGN PATENT DOCUMENTS

| | | |
|---|---|---|
| DE | 202011050264 | 8/2012 |
| JP | 09149502 | 6/1997 |

(Continued)

OTHER PUBLICATIONS

International Search Report for Application No. PCT/EP2013/069216 dated May 15, 2014 (English Translation, 2 pages).

*Primary Examiner* — Lincoln D Donovan
*Assistant Examiner* — Diana J. Cheng
(74) *Attorney, Agent, or Firm* — Michael Best & Friedrich LLP

(57) ABSTRACT

The invention relates to an energy transmission device (30) having a connection unit (32) for connecting an electrical energy source (16) or an electrical energy sink (12), a transmission member (34) which is electrically coupled to the connection unit (32) and which can be electrically coupled to a second transmission member (34) for transmitting electrical energy, and a cleaning unit (36) that is designed to introduce a cleaning medium (37) into a transmission path (26) between the first transmission member (34) and the second transmission member (34) in order to remove particles (28) from the transmission path (26).

17 Claims, 2 Drawing Sheets

(51) Int. Cl.
　　　*B60L 11/18*　　　(2006.01)
　　　*H01F 38/14*　　　(2006.01)
　　　*H02J 7/02*　　　(2016.01)

(52) U.S. Cl.
　　　CPC ........... *H02J 50/10* (2016.02); *Y02T 10/7005* (2013.01); *Y02T 10/7072* (2013.01); *Y02T 90/122* (2013.01); *Y02T 90/14* (2013.01)

(58) Field of Classification Search
　　　CPC .............. B60L 11/1829; B60L 11/1838; B60L 11/184; B60L 11/185; B60L 11/1851; B60L 11/187; B60L 11/1897; H01F 38/14; H01F 2038/143; Y02T 10/70; Y02T 10/7005; Y02T 10/7038; Y02T 10/7044; Y02T 10/705; Y02T 10/7055; Y02T 10/7072; Y02T 10/7077; Y02T 10/7083; Y02T 10/7088; Y02T 10/7094; Y02T 10/72; Y02T 10/7258; Y02T 10/7266; Y02T 10/7275; Y02T 10/7283; Y02T 10/7291
　　　USPC ......................................................... 307/104
　　　See application file for complete search history.

(56) References Cited

FOREIGN PATENT DOCUMENTS

| JP | 2011125153 | 6/2011 | | |
| WO | WO 2014156276 A1 | * | 10/2014 | ............. G01B 7/023 |

* cited by examiner

ENERGY TRANSMISSION DEVICE AND ENERGY TRANSMISSION SYSTEM

BACKGROUND OF THE INVENTION

The present invention relates to an energy transmission device having a connection unit for connecting an electrical energy source or an electrical energy sink and a transmission member which is electrically coupled to the connection unit and can be electrically coupled to a second transmission member for transmitting electrical energy.

The present invention further relates to an energy transmission system having a first energy transmission unit and a second energy transmission unit which can be electrically coupled to the first energy transmission unit in order to transmit electrical energy.

In the field of motor vehicle drive technology, it is universally known how an electrical machine is used as the sole drive or jointly with a drive motor of a different type (hybrid drive). In such electric or hybrid vehicles, electrical machines are typically used as the driving motors which are supplied with electrical energy by an electrical energy storage, such as, for example, a battery. The electrical energy storages of electric vehicles or plug-in hybrid vehicles have to regularly, depending on the charging state, be connected to a public energy supply in order to charge the energy storage with electrical energy.

A cable can, for example, be used to transmit electrical energy from a charging station to the vehicle. Such a cable connection is however not very user friendly and furthermore represents a possible danger to the user because said user could come into contact with live parts if the plug connection or the cable is damaged.

As an alternative to the cable connection, there is the option of supplying the vehicles with electrical energy via a wireless energy transmission. In the case of an inductive energy transmission, an alternating magnetic field is generated on the primary side with the aid of a coil. At least a portion of said alternating magnetic field penetrates a secondary side which likewise has a coil. A voltage is thereby induced in the coil of the secondary side, and energy is thus transmitted from the primary side to the secondary side. The coil system of the primary side and the secondary side can therefore be modelled as a transformer with a large air gap. The air gap causes large leakage inductances and a relatively poor coupling between the primary and the secondary coil. The leakage inductances lead to high reactive currents in the system which do not contribute to the transmission of energy but produce ohmic losses. For that reason, the efficiency of the wireless energy transmission is worse than that of the cable-based transmission. Nevertheless, such an energy transmission is more user friendly due to the ease of use thereof and therefore enjoys greater acceptance among users.

Operational reliability represents an important topic in systems employing wireless energy transmission. During the energy transmission, a magnetic field of high field strength and flux density is thus built up in a region between the primary side and the secondary side. If, for example, magnetizable dust particles or contaminants are located in this gap, said particles or contaminants are then heated up dramatically by the induced eddy currents. As a result, the magnetizable dust particles or contaminants are released as glowing material in an area surrounding the wireless energy transmission and thus endanger people and objects in this area. Wireless energy transmission devices can therefore not be used in environments in which such magnetizable dust particles or contaminants occur (for example iron ore mining operations, metal workshops, steel plants etc.)

SUMMARY OF THE INVENTION

The present invention therefore provides an energy transmission device having a connection unit for connecting an electrical energy source or an electrical energy sink, a transmission member which is electrically coupled to the connection unit and which can be electrically coupled to a second transmission member for transmitting electrical energy, and a cleaning unit that is designed to introduce a cleaning medium into a transmission path between the first transmission member and the second transmission member in order to remove particles from the transmission path.

The present invention furthermore provides an energy transmission system having a first energy transmission unit and a second energy transmission unit, which can be electrically coupled to the first energy transmission unit in order to transmit electrical energy, wherein at least one of the energy transmission units has an energy transmission device according to the present invention.

Particles are effectively removed from the transmission path between the first transmission member and the second transmission member by means of the cleaning unit according to the invention. In so doing, the wireless energy transmission device can also be operated in environments in which magnetizable dust particles or contaminants can be expected. The potential danger to the wireless energy transmission is reduced. The energy transmission device can therefore be operated with the highest possible degree of efficiency.

In addition, the cleaning unit ensures, e.g., that no larger stones are still located in the transmission path. The distance between the first and the second transmission member can therefore be set such that the highest possible degree of efficiency can be achieved during the energy transmission.

In one embodiment of the invention, the cleaning unit can thereby only be disposed in the first energy transmission unit or in the second energy transmission unit. In so doing, costs can be saved because the cleaning unit is only provided in one of the energy transmission units.

In an alternative embodiment, both energy transmission units can each have an energy transmission device according to the invention. As a result, a very effective and thorough cleaning of the particles from the transmission path is made possible.

In one embodiment, the particles comprise magnetizable particles.

Eddy currents are induced in the magnetizable particles by the alternating magnetic field. The eddy currents in turn lead to a very excessive heating up of said particles. The particles that have been heated up until incandescence are released in an area surrounding the wireless energy transmission and therefore endanger people and objects in this area. Fires can, for example, be ignited by the heated particles. By virtue of the cleaning unit according to the invention, the magnetizable particles can be removed from the transmission path. As a result, the dangers described above can be avoided. Hence, the energy transmission device can also be operated in environments in which metal filings and/or metal dusts are present.

According to a further embodiment, the energy transmission device furthermore has a control unit which is designed to detect a convergence of the first transmission member and the second transmission member and to control the cleaning unit on the basis of the detected convergence.

By means of this measure, the cleaning of the transmission path is automatically started when a convergence of the first transmission member and the second transmission member is detected. A manual intervention is therefore not necessary. The cleaning of the transmission path can thus, for example, take place while a correct air gap is being set between said first and said second transmission member. As a result, the energy transmission can be immediately started upon reaching the correct air gap spacing because the cleaning of the transmission path has already taken place.

In an alternative embodiment, the cleaning of the transmission path can also first be started if the correct spacing between the two transmission members has been achieved.

In a further embodiment, the control unit is additionally designed to detect a degree of contamination of the transmission path. In addition, the control unit can be designed to control the cleaning unit as a function of the degree of contamination.

This allows for a cleaning of the transmission path which is both flexible and adapted to the degree of contamination of said path.

In a further embodiment, the cleaning unit is designed to remove particles from surface portions of the first and/or the second transmission member disposed in a region of the transmission path.

If the energy transmission device is used in contaminated environments, magnetizable dust particles can then, for example, settle on the surfaces of the transmission members. During a subsequent energy transmission, the magnetizable dust particles would be very excessively heated up due to the induced eddy currents and could thereby damage the transmission members. With the aid of the cleaning unit according to the invention, the particles or, respectively, the magnetizable dust particles, which have settled on the surfaces of the transmission members, can be removed from the transmission path. As a result of this action, damage to the transmission members can be avoided.

According to a further embodiment, the first transmission member comprises a coil for transmitting electrical energy.

The first transmission member can be electrically coupled to the second transmission member with the aid of the coil. If magnetizable particles are situated on the surface of the coil, said particles are then removed from the transmission path by the cleaning unit prior to starting the energy transmission. The danger caused by flying, glowing particles is therefore reduced.

In a further embodiment, the cleaning unit has at least one supply unit for introducing a cleaning medium into a region of the transmission path, wherein the cleaning medium is designed to remove the particles from the transmission path.

Provision is made according to the invention for a supply unit which, for example, can be implemented as a rinsing channel in the transmission member. The supply unit is used to apply the cleaning medium to the surfaces of the transmission members and to introduce said cleaning medium in the region between the transmission members. This enables a very thorough cleaning of the entire transmission path.

According to a further embodiment, the supply unit is coupled to a pressure unit which is designed to introduce the cleaning medium, with the aid of the supply unit, under pressure into the region of the transmission path.

The transmission path can be more effectively and thoroughly cleaned of the particles by introducing the cleaning medium under pressure.

In a further embodiment, the cleaning medium comprises ambient air, wherein the cleaning unit is designed to introduce compressed air into the region of the transmission path.

The applied compressed air enables the transmission path to be thoroughly cleaned and essentially does not leave any residues on the surfaces of the transmission members. As a result, a magnetic grime is effectively removed from the transmission path. The wireless power transmission is therefore possible in a hazard-free manner.

According to a further embodiment, the cleaning medium comprises water and/or solvent.

The solvent or water can be added to the compressed air for environments in which sludgy contaminants can be expected. As an alternative, the solvent and/or the water can exclusively be used as the cleaning medium.

In a further embodiment, the supply unit is disposed in such a way that the cleaning medium can be introduced in a central region of the transmission path in the vicinity of the first transmission member.

This measure ensures that a thorough cleaning of the transmission members which covers as large an area as possible takes place. A very good cleaning of the area between the transmission members is likewise achieved with this arrangement.

In an alternative embodiment, the supply unit can however also be disposed at any other desired position in the vicinity of the transmission path.

In a further embodiment, the cleaning unit has a brush which is movably mounted at the energy transmission device and is designed to remove the particles from the transmission path by means of a movement relative to the energy transmission device.

In so doing, an electrically non-conductive and/or non-magnetizable brush is used. The surface of the energy transmission device or, respectively, the transmission path can be cleaned by means of a rotary or wiping motion of the brush. In addition to the motion of the brush, compressed air and/or a solvent can, for example, be introduced into the transmission path in order to support the cleaning process.

In a further embodiment, the cleaning unit comprises a sensor which is designed to detect wear to the brush.

As a result, it will be automatically detected that, e.g., the bristles of the brush are worn and therefore the brush should be replaced in order to maintain the efficiency of the cleaning process.

In a particularly preferred embodiment of the energy transmission system, the first energy transmission unit is installed in a motor vehicle which can be electrically driven and is coupled to a traction battery of the motor vehicle; and the second energy transmission unit is installed in a charging station and is electrically coupled to an energy supply network.

In this embodiment, the electrical energy can be transmitted from the energy supply network to the traction battery in order to charge said traction battery. In a further exemplary embodiment, the traction battery can also feed electrical energy into the energy supply network.

In so doing, the cleaning unit can, for example, only be disposed in the energy transmission unit of the charging station.

As a result, costs can be saved because the energy supply device is only provided in one of the energy transmission units.

In an alternative embodiment, the energy transmission device can also be installed only in the energy transmission unit of the motor vehicle which can be electrically driven. This thereby ensures that a solution which is independent of the charging station can be directly implemented in the motor vehicle. The motor vehicle equipped with the inventive cleaning unit can thus be wirelessly charged in all environments independently of the embodiment of the charging station.

In a further alternative embodiment, the first energy transmission unit as well as the second energy transmission unit has an energy transmission device comprising a cleaning unit. In so doing, the transmission path between the transmission members can be very effectively and thoroughly cleaned. Dangers arising from heated, glowing particles can be avoided.

In a further embodiment of the energy transmission system, the first energy transmission unit can also be installed in a work machine, such as, e.g., a wheel loader, a dumper or a drilling rig, which are used, e.g., in a mine. The first energy transmission unit is thereby coupled to a battery which provides energy for the work functions to be performed.

DETAILED DESCRIPTION

Figure 1:
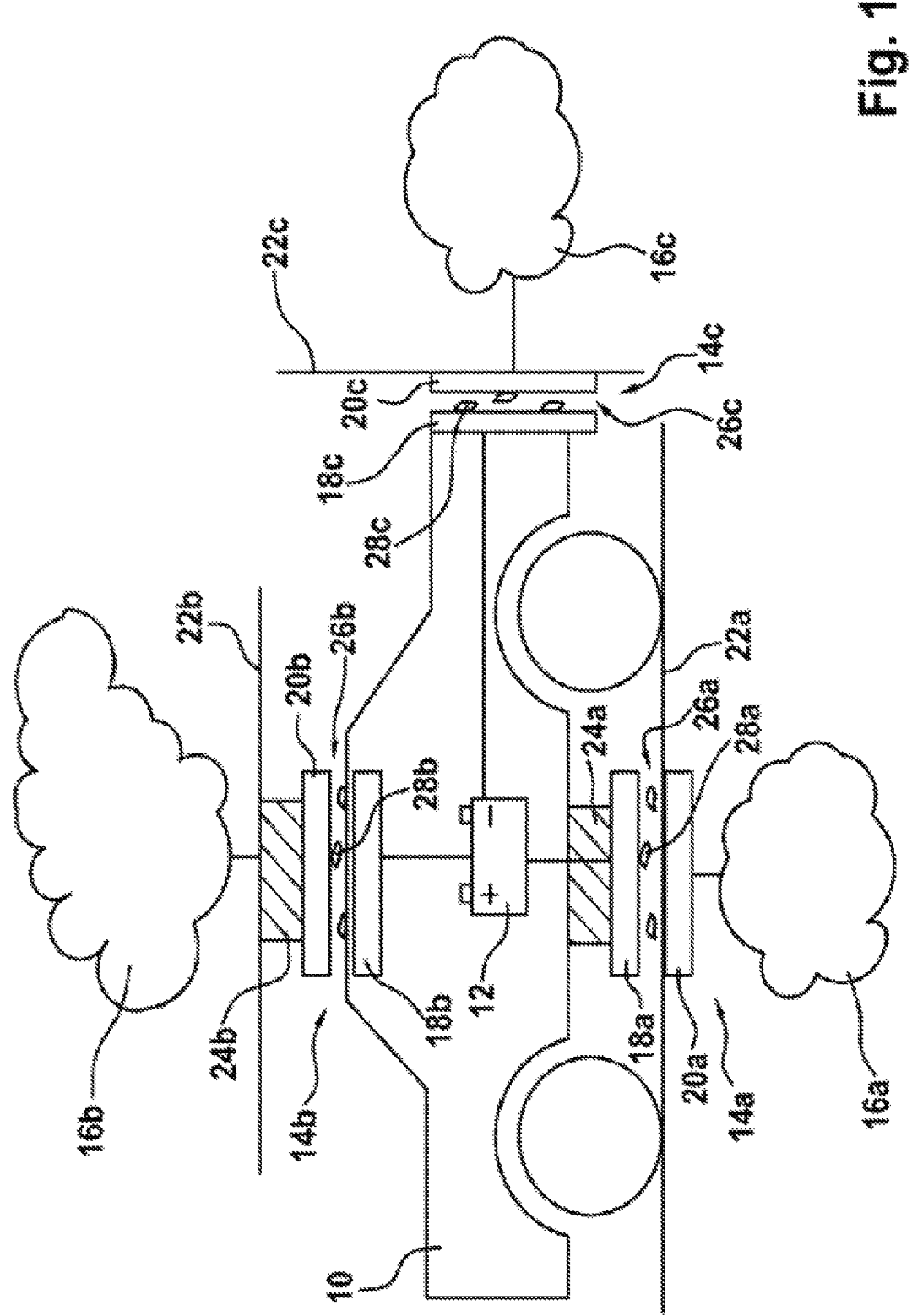
FIG. 1 shows in schematic form an electrically driven motor vehicle and an energy transmission system.

In FIG. 1, an electrically driven motor vehicle is schematically depicted and generally denoted with the reference numeral 10. The electrically driven vehicle 10 is, for example, an electrically powered vehicle 10 or a hybrid vehicle 10. In such electric or hybrid vehicles, electrical three-phase machines are typically used as the drive motor. The three-phase machine, which is not specified in FIG. 1, is usually supplied with electrical energy by a traction battery that is located on board the motor vehicle 10. After a certain operating time of the motor vehicle 10, the traction battery 12 has to be recharged with electrical energy. To this end, the traction battery 12 is electrically coupled via an energy transmission system 14 to the energy supply network 16. In FIG. 1, three alternative coupling options are shown which are identified by means of the corresponding energy transmission systems 14a, 14b, 14c and their associated energy supply networks 16a, 16b, 16c. As can be seen in FIG. 1, the energy transmission system 14 can, for example, have a vertical or horizontal orientation.

The energy transmission system 14 comprises a first energy transmission unit 18 and a second energy transmission unit 20. The first energy transmission unit 18 and the second energy transmission unit 20 can be electrically coupled to one another in order to transmit energy between the two energy transmission units 18, 20. In the present example, the first energy transmission unit 18 is fixedly installed to the motor vehicle 10 and electrically coupled to the traction battery 12. On the other hand, the second energy transmission unit 20 is installed at a fixed position 22 and is electrically coupled to the energy supply network 16. In so doing, the second energy transmission unit 20 can form a portion of a fixedly installed charging station. Depending on the exemplary embodiment, the fixed position 22 can, for example, be a driving surface 22a, in which the second energy transmission unit 20a is embedded. The fixed position 22 can also alternatively be a garage ceiling 22b or a wall 22c.

The first energy transmission unit 18 and/or the second energy transmission unit 20 can optionally be coupled to a corresponding lifting and lowering device 24. With the aid of the lifting and lowering device 24, a short transmission path, in the present example a small air gap 26, can be adjusted between the two energy transmission units 18, 20. An effective power transmission of the energy transmission system 14 is thus ensured by the small air gap 26.

If the traction battery 12 is charged with electrical energy by means of the energy transmission system 14 and the energy supply network 16 coupled thereto, an alternating magnetic field with a high field strength and flux density is then built up between the two energy transmission units 18, 20. When using the energy transmission unit 14 in an environment, in which magnetizable dust particles or contaminents can be expected (for example: iron ore mining operations, metal workshops, steel plants etc.), magnetizable particles 28 can be situated in the transmission path 26. As a result, the magnetizable particles 28 can be disposed on surfaces of the energy transmission units 18, 20 and/or in a gap between said energy transmission units 18, 20.

Upon starting the energy transmission, the magnetizable particles 28 are heated up excessively due to the induced eddy currents. The glowing particles 28 are released in an area surrounding the energy transmission system 14 and can therefore endanger people and/or damage objects. A fire can, for example, be ignited by the flying, glowing particles 28. It is likewise conceivable that the energy transmission units 18, 20 can be damaged by the glowing particles 28.

In order to avoid such danger or damage, the energy transmission system 14 according to the invention is designed to remove the particles 28 from the transmission path 26 prior to or during the energy transmission.

Figure 2:
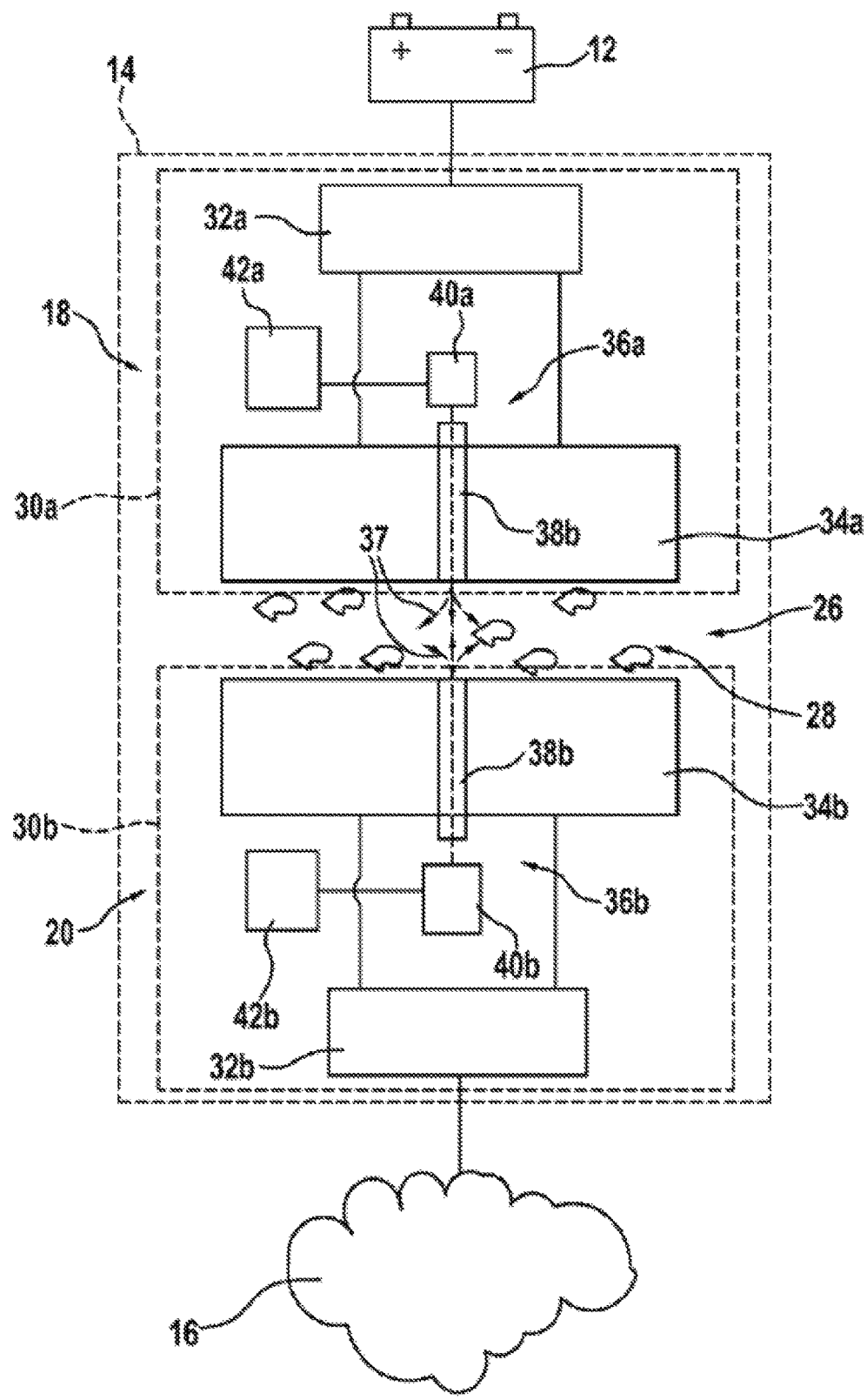
FIG. 2 shows in schematic form a detailed design of the energy transmission system.

In order to provide a more detailed clarification, a detailed, schematic view of the energy transmission system 14 is shown in FIG. 2. In the present example, it is to be assumed that the first energy transmission unit 18 as well as the second energy transmission unit 20 comprise an energy transmission device 30 according to the invention. In an alternative embodiment of the energy transmission system 14, it is also possible for only one of the two energy transmission units 18, 20 to comprise the energy transmission device 30.

The energy transmission device 30 has a connection unit 32 and a transmission member 34 which are electrically coupled to one another. In the example illustrated in FIG. 2, the connection unit 32a is electrically coupled to the fraction battery 12 and the connection unit 32b is electrically coupled to the energy supply network 16. The transmission members 34a, 34b can have, for example, coils 34a, 34b which can be electrically coupled in order to transmit electrical energy.

As already explained with regard to FIG. 1, the magnetizable particles 28 situated in the transmission path 26 are heated up excessively upon starting the energy transmission. For that reason, the magnetizable particles 28 should preferably be removed prior to or shortly after the start of the energy transmission on the transmission path 26. To this end, the energy transmission device 30 comprises a cleaning unit 36. The cleaning unit 36 is designed to introduce a cleaning medium 37 into the transmission path 26 between the transmission member 34a and the transmission member 34b in order to remove the particles 28 from said transmission path 26. As a result, possible dangers to people and damage to objects can be avoided.

In order to introduce the cleaning medium 37 into a region of the transmission path 26, the cleaning unit 36 has a supply unit 38 which is preferably disposed in a central region of the transmission member 34; thus enabling the cleaning medium 37 to be introduced into a central region of the transmission path 26. In addition, the cleaning unit 36 has a pressure unit 40 which is coupled to the supply unit 38. With the aid of the pressure unit 40 and the supply unit 38, the cleaning medium 37 can be introduced under pressure into the region of the transmission path 26. The transmission path can thereby be very effectively cleaned of the magnetizable particles 28. In so doing, magnetizable particles 28 which have settled on the surfaces of the transmission members 34, as well as magnetizable particles which are situated between the two transmission members 34 are removed from the transmission path 26.

Compressed air 37 can, for example, be blown as a cleaning medium 37 into the region of the transmission path. In environments with sludgy contaminants, a solvent or water can be added to the compressed air. In an alternative embodiment, the compressed air 37 can also be replaced by the solvent or water. The wireless energy transmission can be safely carried out by removing the magnetizable particles (for example: metallic filings and metallic dust).

The energy transmission device 30 furthermore comprises a control unit 42, which is designed to detect a convergence of the transmission member 34a and the transmission member 34b. If such a convergence is detected, the control unit 42 controls the cleaning unit 36 in order to start the introduction of the cleaning medium 37 into the transmission path 26. In order to determine the amount of convergence of the two transmission members 34, the control unit 42 can, for example, be coupled to sensors which are not specified in FIG. 2 and are designed to detect an opposing transmission member 34. The control unit 42 can alternatively derive the convergence of the two transmission members 34 from the change in the magnetic coupling and the associated change in electrical variables of the transmission member 34.

The control unit 42 controls the cleaning unit 36 or, respectively, the pressure unit 40 in such a way that the cleaning medium 37 is introduced into the transmission path 34 upon detection of the convergence of the transmission members 34 up until a predefined distance between the transmission members has been achieved. In so doing, the transmission path 26 is cleaned of the magnetizable particles 28 before the energy transmission is started. Hence, dangers to people or even damage to the transmission members are avoided.

In an alternative embodiment, the control unit 42 can control the cleaning unit 36 such that the cleaning medium 37 is first introduced into the transmission path 26 as soon as a predefined distance between the transmission members 34 is undershot. As a result, the cleaning medium 37 is then first introduced when the greatest possible cleaning force can be achieved.

In a further alternative embodiment, the control unit 42 is additionally designed to detect a degree of contamination of the transmission path 26. The cleaning unit 36 is then actuated by the control unit 42 as a function of said degree of contamination. A higher pressure at the pressure unit 40 can thus, for example, be adjusted when a higher degree of contamination has been detected. Furthermore, the option exists for mixing in a larger amount of solvents as a function of the degree of contamination.

A wireless energy transmission can also be safely used in environments in which magnetizable dust particles or contaminants are to be expected as a result of the energy transmission device 30 according to the invention.

Although preferred embodiments of the inventive energy transmission device 30 and the inventive energy transmission system 14 have thus been depicted, it goes without saying that different variations and modifications can be undertaken without deviating from the scope of the invention.

For example, the energy transmission system 14 can be used in any inductively coupled energy transmission system. The energy transmission system 14 can thus also be used with inductive charging devices for machines.

In addition, the cleaning unit 36 can be disposed on a mobile and/or fixedly mounted transmission member 34.

The invention claimed is:

1. An energy transmission device comprising:
a connection unit for connecting an electrical energy source or an electrical energy sink to another electrical device,
a first transmission member which is electrically coupled to the connection unit and which can be electrically coupled to a second transmission member for transmitting electrical energy, and
a cleaning unit that is designed to introduce a cleaning medium into a transmission path between the first transmission member and the second transmission member in order to remove particles from the transmission path,
wherein the cleaning unit introduces the cleaning medium into the transmission path in response to a detected convergence between the first transmission member and the second transmission member and ceases to introduce the cleaning medium into the transmission path once the detected convergence between the first transmission member and the second transmission is less than a predefined distance.

2. The energy transmission device according to claim 1, wherein the particles comprise magnetizable particles.

3. The energy transmission device according to claim 1, wherein the energy transmission device further comprises a control unit which is designed to detect the convergence between the first transmission member and the second transmission member and to control the cleaning unit on the basis of the detected convergence.

4. The energy transmission device according to claim 1, wherein the cleaning unit is designed to remove the particles that are disposed in a region of the transmission path from surface portions of the first transmission member, the second transmission member, or both.

5. The energy transmission device according to claim 1, wherein the first transmission member has a coil for transmitting electrical energy.

6. The energy transmission device according to claim 1, wherein the cleaning unit has at least one supply unit for introducing the cleaning medium into a region of the transmission path, the cleaning medium being designed to remove the particles from the transmission path.

7. The energy transmission device according to claim 6, wherein the supply unit is coupled to a pressure unit which is designed to introduce the cleaning medium under pressure into the region of the transmission path with the aid of the supply unit.

8. The energy transmission device according to claim 7, wherein the cleaning medium comprises ambient air and wherein the cleaning unit is designed to introduce compressed air into the region of the transmission path.

9. The energy transmission device according to claim 6, wherein the cleaning medium comprises water, solvent, or both.

10. The energy transmission device according to claim 6, wherein the supply unit is disposed in such a way that the cleaning medium can be introduced in a central region of the transmission path in the vicinity of the first transmission member.

11. The energy transmission device according to claim 1, wherein the cleaning unit introduces the cleaning medium into the transmission path once the detected convergence between the first transmission member and the second transmission member is a predefined distance.

12. The energy transmission device according to claim 1, wherein the energy transmission device further comprises a control unit configured to detect a degree of contamination of the transmission path and control the cleaning unit based on the degree of contamination.

13. The energy transmission device according to claim 1, wherein the energy transmission device further comprises a lifting and lowering device configured to adjust the distance between the first transmission member and the second transmission member.

14. The energy transmission device according to claim 1, wherein the convergence between the first transmission member and the second transmission member is detected when a spacing between the first transmission member and the second transmission member is present.

15. The energy transmission device according to claim 1, wherein the convergence between the first transmission member and the second transmission member is derived by the control unit from the change in the magnetic coupling of the first transmission member and the second transmission member.

16. An energy transmission system comprising:
a first energy transmission unit, and
a second energy transmission unit which can be electrically coupled to the first energy transmission unit for transmitting electrical energy,
wherein at least one of the first and second energy transmission units comprises
a connection unit for connecting an electrical energy source or an electrical energy sink to another electrical device,
a first transmission member which is electrically coupled to the connection unit and which can be electrically coupled to a second transmission member for transmitting electrical energy, and
a cleaning unit that is designed to introduce a cleaning medium into a transmission path between the first transmission member and the second transmission member in order to remove particles from the transmission path,
wherein the cleaning unit introduces the cleaning medium into the transmission path in response to a detected convergence between the first transmission member and the second transmission member and ceases to introduce the cleaning medium into the transmission path once the detected convergence between the first transmission member and the second transmission is less than a predefined distance.

17. The energy transmission system according to claim 16, wherein the first energy transmission unit is installed in a motor vehicle and is electrically coupled to a battery of the motor vehicle, and wherein the second energy transmission unit is installed in a charging station and is electrically coupled to an energy supply network.

* * * * *